United States Patent [19]
Hickey et al.

[11] Patent Number: 5,150,773
[45] Date of Patent: Sep. 29, 1992

[54] ELECTRICALLY ACTUATED ELECTRIC BRAKE WITH WEAR COMPENSATING ADJUSTER

[75] Inventors: Gregory M. Hickey, Dayton; Norbert J. Green, Jr., Trotwood; Michael J. Kozak, West Carrollton, all of Ohio

[73] Assignee: General Motors Corporation, Detroit, Mich.

[21] Appl. No.: 672,816

[22] Filed: Mar. 21, 1991

[51] Int. Cl.⁵ ............................................. F16D 65/58
[52] U.S. Cl. ................................. 188/79.55; 188/162; 188/196 R
[58] Field of Search ............ 303/20; 188/79.51, 79.55, 188/79.62–79.64, 79.54, 156, 157, 162, 196 R, 196 B, 196 BA, 196 P, 196 D, 196 V, 325, 326, 328, 331, 332

[56] References Cited

U.S. PATENT DOCUMENTS

| | | | |
|---|---|---|---|
| 1,680,986 | 8/1928 | Harelik | 188/79.55 |
| 1,793,470 | 2/1931 | Enderby | 188/79.55 |
| 1,875,064 | 8/1932 | Lyman | 188/79.55 X |
| 5,000,297 | 3/1991 | Shaw et al. | 188/156 |
| 5,024,299 | 6/1991 | Shaw et al. | 188/328 X |
| 5,036,958 | 8/1991 | Yamamoto | 188/79.55 |

FOREIGN PATENT DOCUMENTS

| | | | |
|---|---|---|---|
| 40643 | 7/1932 | France | 188/79.51 |
| 187293 | 2/1937 | Switzerland | 188/79.51 |
| 411567 | 12/1933 | United Kingdom | 188/196 BA |
| 2211566 | 7/1989 | United Kingdom | 188/79.51 |

*Primary Examiner*—Robert J. Oberleitner
*Assistant Examiner*—Alfred Muratori
*Attorney, Agent, or Firm*—Ernest E. Helms

[57] ABSTRACT

An electrically actuated brake is provided with an adjustment mechanism to compenate for wear of the brake shoes. The brake in a preferred embodiment includes a motor driven actuator to apply the brake shoes and a first rotative member torsionally associated with a rotor of the motor. A spring returns the brake shoes from an actuated position to a release position causing the first rotative member to rotate in a releasing direction. A second rotative member having a first surface for making torsional transferring engagement with the first rotative member when the first rotative member is rotating in a friction member applying or releasing direction is provided. The second rotative member also has a second surface of a non-torsional transferring engagement. The second surface is exposed to the first rotative member when the first rotative member has rotated in an applying direction beyond a predetermined limit due to wear of the brake shoes. A stop is provided for limiting the retractive rotation of the second rotative member when the first surface of the second rotative member is in torsional engagement with the first rotative member. A compliant radial projection of the second rotative member hits an abutment to bias the second rotative member to expose its first surface to the first rotative member when the second surface of the second rotative member is exposed to the first rotative member.

11 Claims, 2 Drawing Sheets

ELECTRICALLY ACTUATED ELECTRIC BRAKE WITH WEAR COMPENSATING ADJUSTER

FIELD ON THE INVENTION

The field of the present invention is that of electrically actuated automotive brakes. More particularly the field of the present invention is that of an electrically actuated automotive drum brake which has means for adjusting the position of the brake shoes as the shoe lining wears.

DISCLOSURE STATEMENT

It has come to pass in the pursuit of an improved vehicle brake, various electrically actuated brakes have been brought forth. An example of such an electrically actuated brake is shown and described in commonly assigned Shaw U.S. Pat. No. 353,120 filed May 17, 1989, now U.S. Pat. No. 5,000,297 the disclosure of which is incorporated by reference herein.

To prevent any drag occurring in the brake during the normal movement of the vehicle it is desirable that the friction elements (shoes in drum type brakes or pads in caliper type brakes; the present invention can be utilized in either type brake however the present disclosure of the invention will mainly be described in the embodiment of a drum type brake) be held away from the brake drum or rotor as far as possible for the prevention of drag. However a countervailing design restraint is that the friction element should be held as close to the drum or rotor to minimize the actuation time of the brake. The minimization of actuation time is even more critical if the electrically actuated brake is being utilized in an antilock braking (ABS) or traction control (TC) or any other braking system which utilizes feedback information from the vehicle wheel being braked to automatically modify the actuation force.

One approach to adjust the position of the brake linings (shoes or pads) is to utilize electronic sensors to determine the angular rotation of the motor rotor which actuates the brakes. The angular rotation is stored in a memory. Upon wear of the brake linings increased rotation of the motor rotor will occur. A controller will compare the new value for angular rotation and thereafter signal the motor to limit the rotation in the releasing direction so that on the next braking cycle the brake pads will be in an adjusted position.

After adjustment has occurred the controller must again reset within its memory the new position of the motor rotor and after wear of the brake lining another cycle of adjustment will occur. The above approach is often difficult to technically achieve and relies upon a plurality of sensors, and programming for a controller, which in most instances is not preferable. Additionally, the above noted adjustment approach requires the motor of the actuator to have a controlled rotation upon the releasing cycle. Other factors which discourage such a system is the added weight which the hardware adds to the braking system, a feature which conflicts with the environmentally mandated desire of reducing vehicle weight.

It is preferable to allow the rotor of the motor to freewheel to the release position and to achieve any adjustment automatically in a mechanically actuated means which is devoid of any requirement for involvement of an electronic sensor or controller.

DISCLOSUREMENT STATEMENT

To meet the above described goals, the present invention is brought forth. The present invention provides an adjuster for an electrically actuated vehicle brake which makes adjustment automatically and deletes any requirement for involvement of a electronic sensor or controller.

It is an object of the present invention to provide an electrically actuated brake with adjustment.

Other objects and advantages of the present invention can become more apparent to those skilled in the art as the nature of the invention is better understood from the accompanying drawing and a detailed description.

DETAILED DESCRIPTION OF THE DRAWINGS

Figure 1:
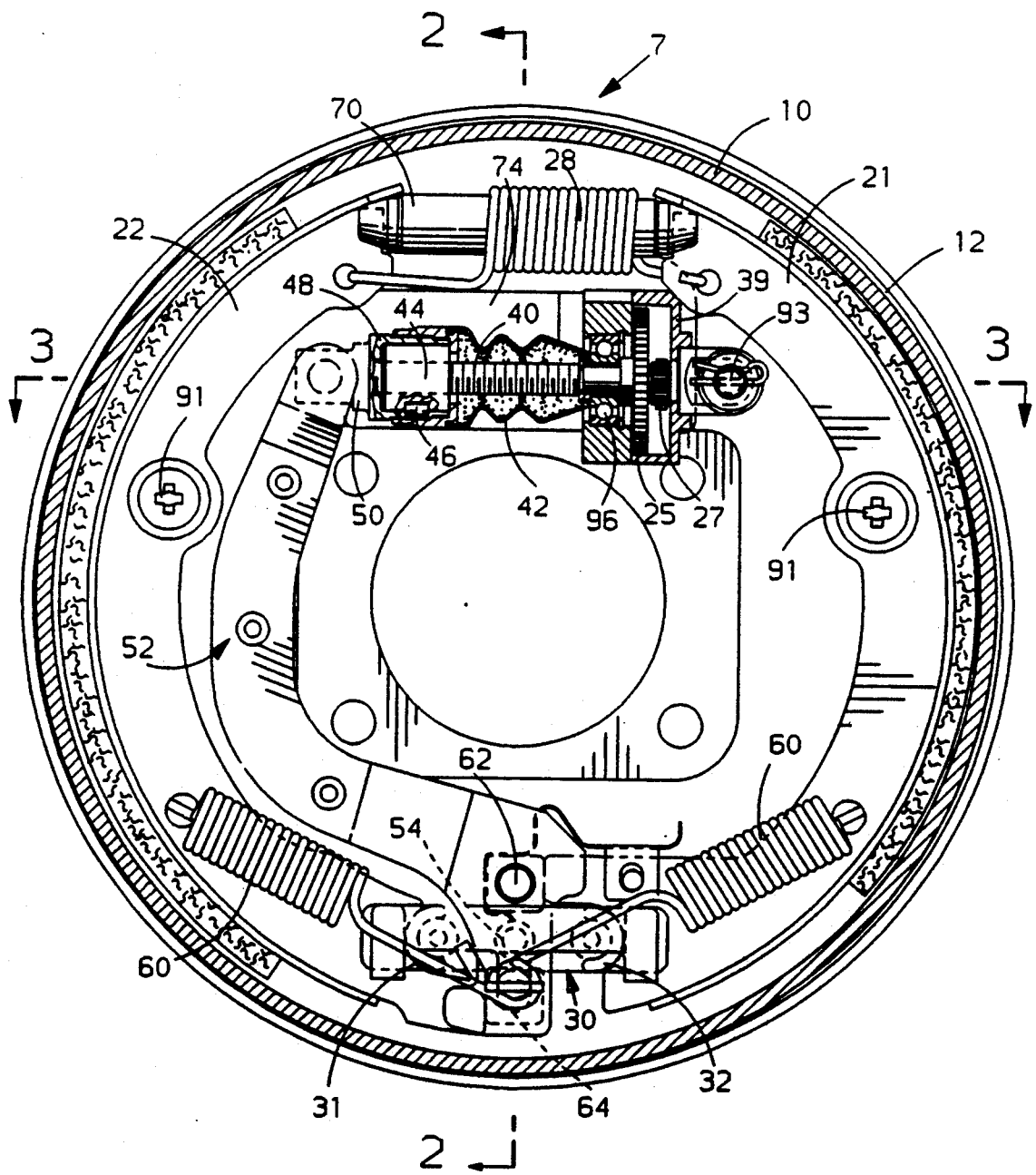
FIG. 1 is a front elevational view of a preferred embodiment vehicle brake of the present invention with portions therein section.
Figure 2:
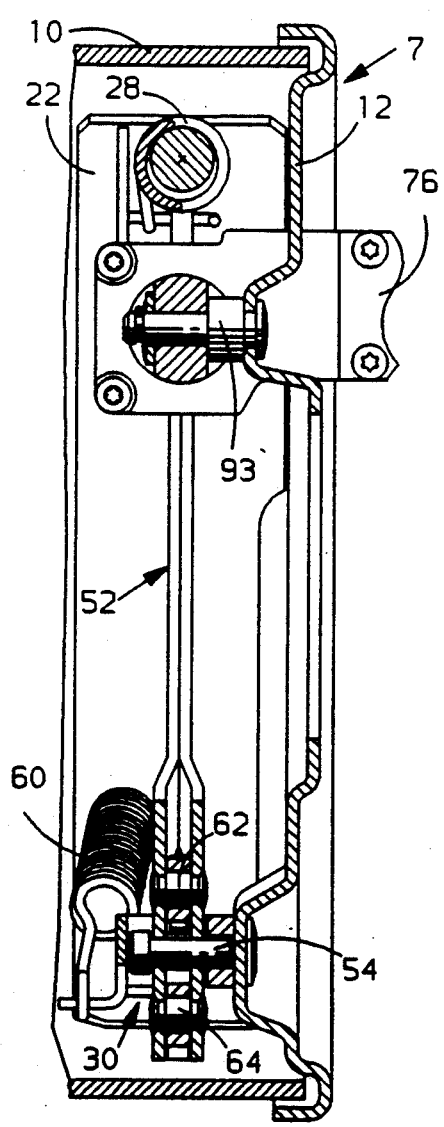
FIGS. 2 and 3 are section views taken from FIG. 1 along lines 2—2 and 3—3 respectively.
Figure 3:
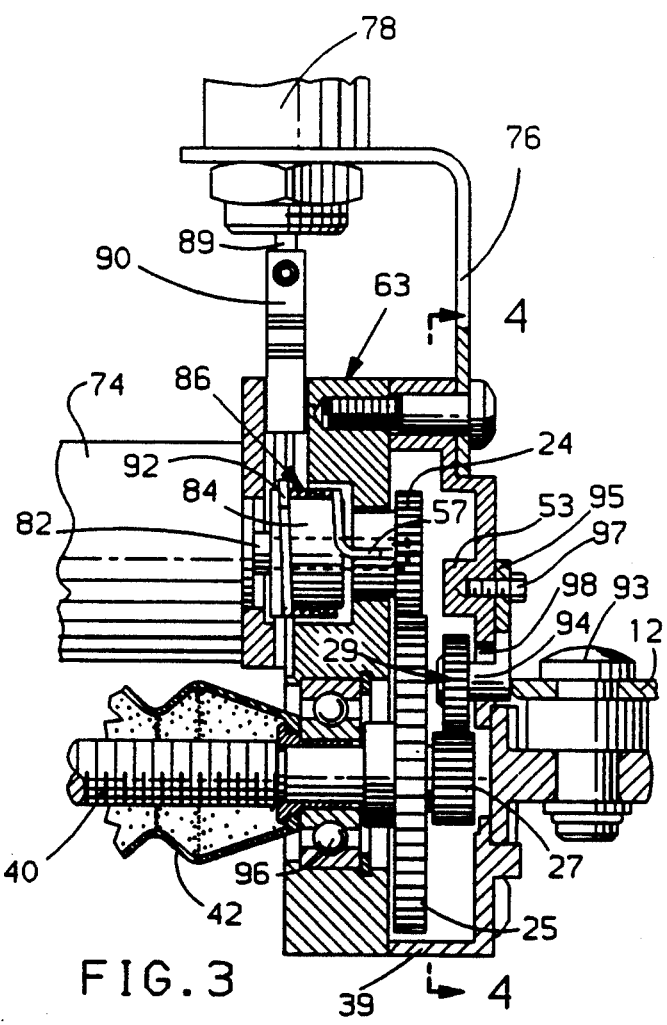
Figure 4:
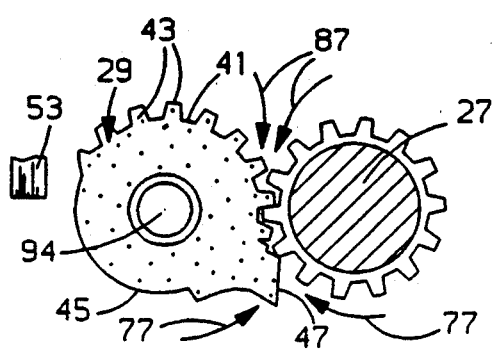
FIG. 4 is a sectional view taken along line 4—4 of FIG. 3.
Figure 5:
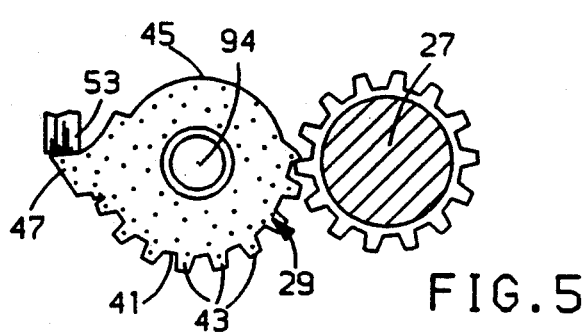
FIG. 5 is a view illustrating the present invention moved from FIG. 4.

Referring to FIGS. 1-4 the drum brake assembly 7 of the present invention has a conventional brake drum 10 (an outline of which is shown) which is provided for connection to the vehicle wheel. Mounted to the vehicle is the backing plate 12 traditionally mounted to the axial housing. Mounted by a spring loaded pins 91 to bias them towards the backing plate 12 are friction means secondary 22 and primary 21 brake shoes. A spring 28 holds the primary 21 and secondary 22 shoes together on the top against a stop 70. At their lower ends the primary 21 and secondary 22 shoes contact an anchor 30 with pins 31 and 32 which is fixed with respect to the backing plate 12. During brake actuation the primary 21 and secondary shoes 22 split apart from one another away from the bottom anchor 30.

Rotatively mounted to the backing plate 12 in position by a bearing 96 is a power screw 40. The power screw 40 is covered by a boot 42 and is threadably engaged with a non-rotative nut 44. The nut is keyed at 46 into a frame member 48 to prevent its rotation. The frame member 48 has an extension 50 (FIG. 1) which is pivotally connected to an apply lever 52. The apply lever 52 is of the shape of a bent arm and has a loss motion pivotal connection with the backing plate intermediate the two anchors pins 32 and 31 for the primary and secondary shoes via a pin 54.

Each brake shoe has a return spring 60 for returning that shoe towards the anchor 30. The apply lever has pivotal movement with respect to the shoes 21, 22 by the shoe actuators 62, 64 which contact portions of the shoes. Movement of the non-rotative nut 44 to the right, as shown in the drawings, will cause the lever 52 to rotate clockwise on the pin 54 causing the shoes 21, 22 to be contacted and separated in an outward direction. The return spring 60 will cause the shoes to return to the non-actuated position.

A housing or frame 63 is provided which mounts an actuating motor to the backing plate 12. An extension 76 of the frame mounts a mechanical hydraulic or thermal actuator 78. A pinion 24 of a gear train is connected to rotor shaft 82 of the motor 74.

The motor 74 powers the drive screw 40 via actuator gears 24 and 25. Connected to the motor shaft 82 is the parking brake drum 84. Surrounding the parking brake drum is a coil spring 86 which has one end 57 which is generally grounded. The spring is configured in such manner that rotation of the motor in a direction to release the brake to a non-activated position will cause the motor drum 84 to wrap in the spring 86 and be restrained from rotation. Therefore, once activated the brake shoes 21, 22 remain activated. To allow the release of the brake shoes 21, 22 from the activated position, there is a linear actuator rod 89 with a hand 90 operatively associated with the free end 92 of the spring. Extension of rod 89 makes a hand 90 contact the free end 92 of the coil spring 86, moving the pins to an unwinding position, therefore allowing free motion of the motor 74. In an alternate embodiment (not shown) the parking brake lock can be incorporated into the motor 74.

The actuator of the vehicle brake 7 includes the lever 52 non-rotative nut 44 drive screw 40 along with meshing gears 25, 24. The rotor shaft 82 is angularly fixed with the gear 24. Torsionally associated with the rotor shaft 82 of the motor is a first gear 27 which is connected with an extension of the drive screw 40.

Next to the first rotative member 27 is a second rotative member 29. The second rotative member 29 is typically fabricated from a polymeric material such as an elastomer. The second rotative member 29 has a first surface 41 with a series of gear teeth 43 for making torsional transferring engagement with the first rotative member 27 when the brake is being applied. In the applying operation the first and second rotative members 27, 29 rotate in a direction of the arrows 87. When the brake is being released the first and second rotative members 27,29 rotate in a direction of arrows 77.

The second rotative member has a second surface 45 for non-torsional transferring engagement with the first rotative member 27. The second rotative member 29 also has a generally radial extension 47 for limiting the angular rotation of the second rotative member with respect to the first rotative member 27.

The first and second rotative members cooperate to provide the adjuster of the present invention. When applying the brakes by virtue of its torsional connection with the rotor shaft 82 the first rotative member 27 will rotate in a direction of arrows 87 causing the second rotative member 29 to rotate in like fashion. Upon release of the brake, the motor 74 will be deactivated and allowed to assume a freewheeling condition. The return springs 60 will cause the shoes 21, 22 to return to their prior position and by virture of interaction with the lever 52. The non-rotative nut 44 will cause a drive screw 40 to rotate in the opposite direction causing the rotative member 27 to rotate in the direction of arrow 77 and in like manner the second rotative member 29 also.

If sufficient wear of the brake linings has occurred, upon actuation of the motor 74 the first rotative member 27 will rotate the second rotative member 29 sufficiently that the first surface 41 will no longer be exposed to the first rotative member and instead the second surface 45 of the second rotative member will now be exposed to the first rotative member 27. Since the second surface 45 has non-torsional transferring engagement, with the first rotative member 27 the motor 74 will be allowed to fully actuate the brake shoes 21, 22 outward to ensure engagement with the brake drum 10. The radial extension 47 at this point will make contact with an abutment member 53. The abutment member is joined to a housing 39 of the brake 7. The combination of the compliance of the general radial extension 47 with the abutment member 53 biases the second rotative member in a direction to re-expose the first surface 41 of the second rotative member 29 with the first rotative member 27 when the brake is released.

When the brakes are again released the first rotative member will again rotate in a direction shown by arrows 77. The biasing provided by the combination of the generally radially member 47 in contact with abutment 53 will urge the second rotative member 29 so that it will again expose the first surface 41 to the first rotative member 27. However the angular alignment between the first and second rotative members will be changed by an angular amount corresponding to the amount of adjustment of the brake shoes 21, 22 outward relating to the increment of adjustment of the adjuster. Therefore upon re-engagement with the first rotative member 27 the second rotative member 29 will have moved angularly slightly with respect to the first rotative member 27.

Upon movement of the second rotative member 29 back in the releasing direction 77 will cause the generally radial extension 47 to act as a stop means limiting the angular movement of the first rotative member 27. This limiting effect will now fix the newly adjusted position of the brake shoes 21, 22 at such a point to where the brake shoes 21, 22 are now more adjacent to the brake drum 12 in compensation for the wear of the brake shoes.

The second rotative member 29 rotates on a shaft 94 connected with retainer portion 95 which is threadably connected behind the abutment member 53 by fastener 97. The above arrangement provides the mean to allow for replacement of the brake shoes 21,22.

When changing the brake shoes 21,22 the fastener 97 is removed and by the retainer 95 the shaft 94 is pulled into a slot 98 allowing the second rotative member 29 to be displaced towards the abutment member 53 causing the teeth 43 or extension 47 to come out of engagement with the first rotative member 27 member. After installation of the new brake, the second rotative member is position to engage with the teeth of the first rotative member 27. The retainer 95 is repositioned and the fastener 97 is inserted. The adjustment mechanism is again ready.

Figure 6:
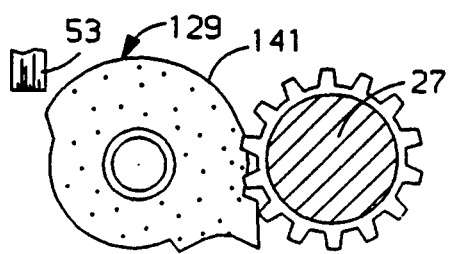
FIG. 6 is an alternate preferred embodiment of the present invention illustrated in view similar to that of FIG. 4.

FIG. 6 refers to an alternate preferred embodiment of the present invention wherein the second rotative member 129 does not have any gear type teeth and the gear type teeth of the first rotative member 27 simply make torsional transferring contact by engagement with and deformation of the first surface 141 of the second rotative member. In an alternative embodiment (not shown) the function of biasing the second rotative member in such a manner to expose the first surface with the first rotative member can be accomplished by a torsional spring.

While embodiments of the present invention have been explained, it will be readily apparent to those skilled in the art of the various modifications which can be made to the present invention without departing from the spirit and scope of this application as it is encompassed by the following claims.

We claim:

1. A vehicle brake having an electrically powered actuator for moving a friction means into contact with a vehicle wheel, the brake having means for adjustment of the brake to compensate for wear of the friction means, the brake including:
   an electric motor with a rotor torsionally associated with the actuator to power the actuator for applying the friction means;
   a first rotative member torsionally associated with the rotor;
   means for returning the friction means from an actuated position to a release position causing the first rotative member to rotate in a releasing direction;
   a second rotative member having a first surface to expose to the first rotative member for making torsional transferring engagement with the first rotative member when the first rotative member is rotating in a friction means applying or releasing direction, the second rotative member having a second surface distinct from the first surface only for a non-torsional transferring engagement which is exposed to the first rotative member when the first rotative member has rotated in an applying direction beyond a predetermined limit due to wear of the friction means;
   stop means for limiting the rotation of the second rotative member when the first surface of the second rotative member is in torsionally transferring engagement with the first rotative member; and
   means for biasing the second rotative member to expose the first surface of the second rotative member to the first rotative member when the second surface of the second rotative member is exposed to the first rotative member.

2. A brake as described in claim 1 wherein said brake is a drum type brake.

3. A brake as described in claim 1 wherein said means for returning the friction means in the releasing direction includes a return spring.

4. A brake as described in claim 1 wherein one of said rotative members has gear type teeth.

5. A brake as described in claim 4 wherein said first and second rotative members have gear type teeth.

6. A brake as described in claim 1 wherein said stop means includes a radial projection on said second rotative member making contact with said first rotative member.

7. A brake as described in claim 1 wherein the means for biasing the second rotative member to expose the first surface includes a generally projecting radial member of the second rotative member making compliant contact with a physical abutment.

8. A brake as described in claim 7 wherein said radial projecting member provides the stop means and the means for biasing the second rotative member to expose the first surface.

9. A brake as described in claim 7 wherein said radial member is formed from a polymeric material.

10. A brake as described in claim 1 wherein there is also means allowing for replacement of the friction means after adjustment has occurred due to wear of the friction means.

11. A vehicle brake having an electrically powered actuator for moving a friction means into contact with a vehicle wheel, the brake having means for adjustment of the brake to compensate for wear of the friction means, the brake comprising:
   an electric motor with a rotor torsionally associated with the actuator to power the actuator for applying the friction means, the rotor being connected with and torsionally associated with a rotor gear;
   a first gear torsionally associated with the rotor gear;
   a return spring for returning the friction means from an actuated position to a released position causing the first gear to rotate in a releasing direction;
   an adjuster rotative member having a first surface to expose to the first gear for making torsional transferring engagement with the first gear when the first gear is rotating in a friction means applying or the releasing direction, the adjuster rotative member having a second surface only for non-torsional transferring engagement which is exposed to the first gear when the first gear has rotated in a friction means applying direction beyond a predetermined limit due to wear of the friction means, the adjuster rotative member being made from an elastomeric material; and
   a generally radial projection joined to the adjuster rotative member providing a stop for limiting the rotation of the first gear in a releasing direction when the first surface of the adjuster rotative member is in torsional transferring engagement with the first gear and the radial projection biasing the adjuster rotative member to expose the first surface of the adjuster rotative member is exposed to the first gear by contact with an abutment of the brake.

* * * * *